2 Sheets--Sheet 1.

H. B. WEAVER.
Improvement in Governors for Steam Engines.

No. 116,248. Patented June 20, 1871.

Witnesses.
L. Häfelin
Geo. G. Sill

Inventor.
Horatio B. Weaver
by W. E. Simonds Atty

2 Sheets--Sheet 2.

H. B. WEAVER.

Improvement in Governors for Steam Engines.

No. 116,248. Patented June 20, 1871.

Witnesses:
L. Hagelin.
Guy G. Ell

Inventor:
Rosalie B. Weaver
by W. E. Simonds
Atty 116,248

UNITED STATES PATENT OFFICE.

HORATIO B. WEAVER, OF HARTFORD, CONNECTICUT.

IMPROVEMENT IN GOVERNORS FOR STEAM-ENGINES.

Specification forming part of Letters Patent No. 116,248, dated June 20, 1871.

*To all whom it may concern:*

Be it known that I, HORATIO B. WEAVER, of Hartford, in the county of Hartford and State of Connecticut, have invented an Improved Governor for Steam-Engines and Water-Wheels and other Motors, of which the following is a specification:

Nature and Objects of the Invention.

This governor is designed to control the supply of steam, water, or other motive power to the engine or wheel driven thereby in such a manner that the same speed will be kept up, although the pressure of the motive power or the load to be driven may vary, provided, always, that there is sufficient amount of motive power to maintain the requisite speed.

Description of the Accompanying Drawing.

Figure 1:
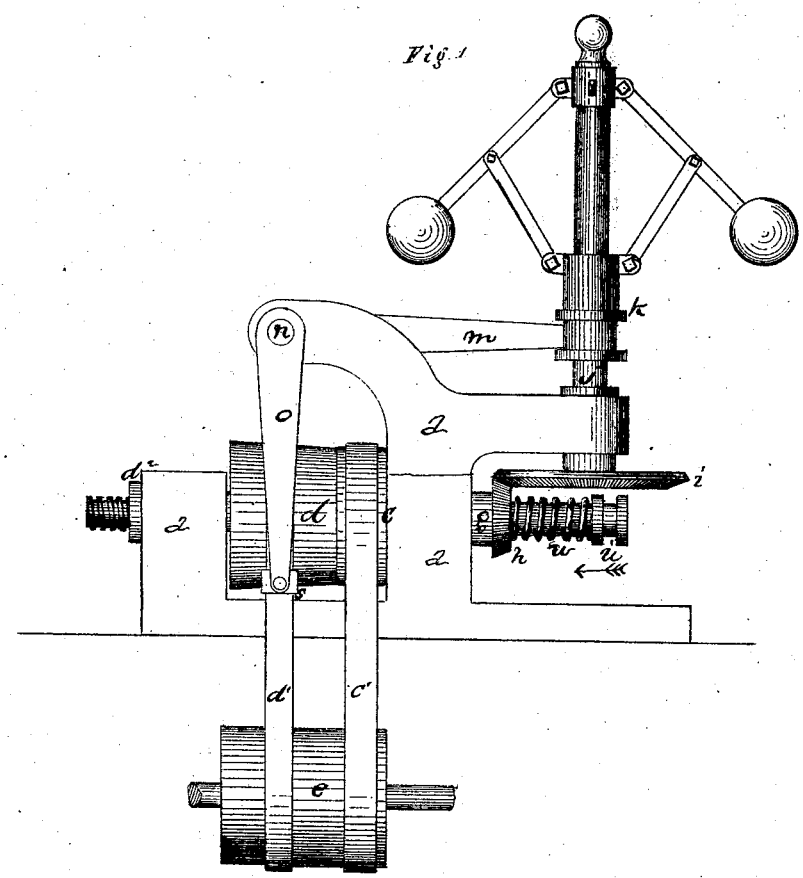
Figure 2:
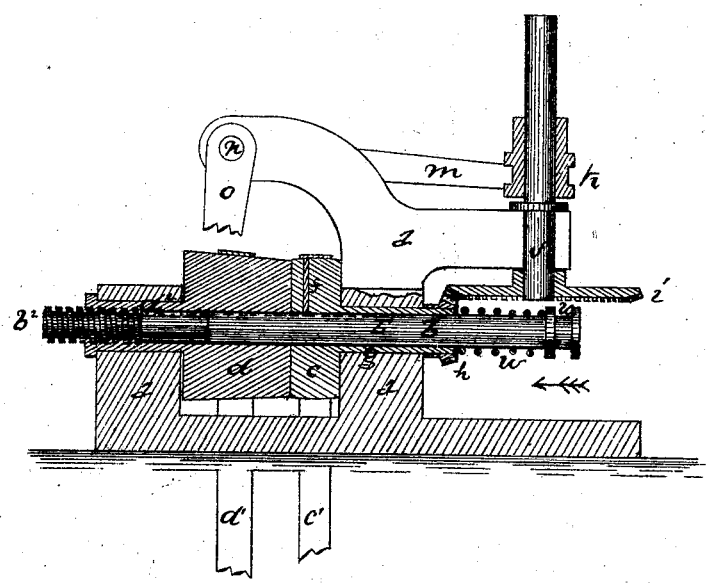

Figure 1 is a side elevation of the device. Fig. 2 is a central vertical longitudinal section of the same.

General Description.

The letter $a$ indicates the frame of the device; $b$, the main shaft, on which are two pulleys, $c$ and $d$. The latter of these is the frustum of a cone, whose diameter through the center of its length is the same as the diameter of the pulley $c$. Both these pulleys are driven by belts from the drum $e$, which is of equal diameter throughout its whole length. These belts are indicated by the letters $c'$ $d^1$. Neither of these pulleys $c$ $d$ are fast on the shaft $b$; but the shaft is made to always revolve with the pulley $c$ by means of a pin, $f$, driven through from the circumference, its inner end projecting into a slot made in one side of the shaft, and extending from the point $b^1$ to the end $b^2$, which, while it serves to make the shaft $b$ revolve synchronously with the pulley $c$, yet allows it to move back and forth lengthwise. From the side of the pulley $c$ a sleeve, $g$, fitting around the shaft $b$, and serving as a bearing both for itself and the shaft, extends through the frame $a$. Upon the end of this sleeve is the small bevel-gear, $h$, meshing into the horizontal bevel-gear $i$, which is fast on the shaft $j$, to the upper end of which is attached a common ball-governor, actuating the sleeve $k$, which in turn moves the arm $m$, which is attached to the shaft $n$, to the opposite end of which is fixed the arm $o$, to the lower end of which is attached the shipper $s$, which controls the sidewise movements of the belt $d^1$, so that, when the balls of the governor rise, the belt $d^1$ will be shifted from the center of the pulley toward that side of the pulley where the diameter is the smallest, and when the balls fall the opposite effect will be produced. The pulley $d$ has a sleeve, $d^2$, upon its side, which serves as a bearing for itself and for the shaft $b$. Within this sleeve a screw-thread is cut upon the shaft $b$, which fits in a female screw in the sleeve $d^2$.

The effect of this arrangement is this: The ball-governor is so adjusted that, at the speed which it is desirable to observe, the sleeve $k$ will be in the center of its vertical play, and at this point it should hold the belt $d^1$ in the center of the length of the pulley $d$, so that it and the pulley $c$ will revolve synchronously. Now, suppose a greater load to be thrown onto the engine or other motor, the balls will fall, and the belt $d^1$ will move toward the large end of the pulley $d$. This will cause the pulley $d$ to revolve more slowly than the pulley $c$, and will cause the shaft $b$ to move lengthwise in the direction indicated by the arrow, which movement, by means of proper connections, made from the collared groove $u$, will allow more steam or other motive power to have access to the motor, and this movement will continue till enough of the motive power is admitted to attain the desired speed, when, of course, the belt $d^1$ will move back to the center of the pulley $d$; but—and this is the important feature of the invention—the shaft $b$ will not move back toward its first position unless the belt $d^1$ moves beyond the center of the pulley toward the smallest diameter thereof. When the speed of the governor-balls exceeds the desired rate this action will be reversed, and the shaft will move in the opposite direction, and the steam or other motive power will be shut off till the desired speed is again reached; but, as before, the shaft will not again move toward its first position till the belt $d^1$ passes by the center of the pulley and toward the large end; so that, however much the power or the load may vary, the governor will immediately adapt itself thereto and still maintain a uniform rate of speed. The difference between it and the common ball-governor is readily explained: In using the common ball-governor no more steam can find access to the cylinder when the load is increased till the speed slackens and thus allows the balls to drop down; and to give a continuance of extra steam the balls must remain down and the speed remain decreased, and vice versa, when the load is lightened and the speed becomes too much accelerated; but this governor, when the load or the power is varied, first opens or shuts off the source of supply till the requisite speed is attained, and then leaves the valve at that point till the speed again varies from the desired rate. When the belt $d^1$ is running on the center of the pulley $d$, which it will do when the balls are running at the desired speed, both the pulleys $c$ and $d$ are running at the same speed, and the shaft $b$ is stationary so far as its lengthwise motion is concerned. If by any chance the end $b^2$ of the shaft $b$ should move so far out in that direction as to entirely clear the screw from the female thread, then the spiral spring $w$ will press the shaft in the opposite direction, so that the screws will again engage when the opportunity is offered. The object of this arrangement is to prevent the valve or gate being operated upon after it is pulled open to its full width, as would be the case if the screw-thread on the shaft $b$ were continuous. After the valve is open to its full width, to open it further will, of course, be of no use. Of course the pulley $d$, instead of being the frustum of a cone, might be made of equal diameter throughout, and the drum which drives it might be the frustum of a cone, and the same purpose would be served.

If for any reason it is found desirable to have the difference between the diameters of the cone-pulley anything very considerable, then the same friction on the belt can be attained by the use of a small "idler"-pulley.

It is not deemed necessary to show how the shaft $b$ is connected with the valve or gate which controls the inlet of motive-power to the engine or wheel, that being a very simple matter to do, the connection being made from the collared groove $u$.

In using this governor on steam-engines it can be connected directly with a stationary cut-off or be made to control a cut-off, which is the steam-valve itself, or be made to control the position of the "block" in a "link," or to control any of the valves in use so far as known to the inventor.

Claims.

I claim as my invention—

1. The shaft $b$, made to revolve synchronously with the pulley $c$, but free to move with reference thereto in the direction of its length, and engaging with the conical pulley $d$ by means of a male and female screw, substantially as described, for the purposes set forth.

2. The combination of the pulley $c$, pulley $d$, shaft $b$, gear $h$, gear $i$, shaft $j$, with the common ball-governor attached thereto, arm $m$, shaft $n$, arm $o$, and shipper $s$, the whole constructed, arranged, and operated substantially as and for the purposes set forth.

HORATIO B. WEAVER.

Witnesses:
WM. E. SIMONDS,
GEORGE G. SILL.